Figure 1:
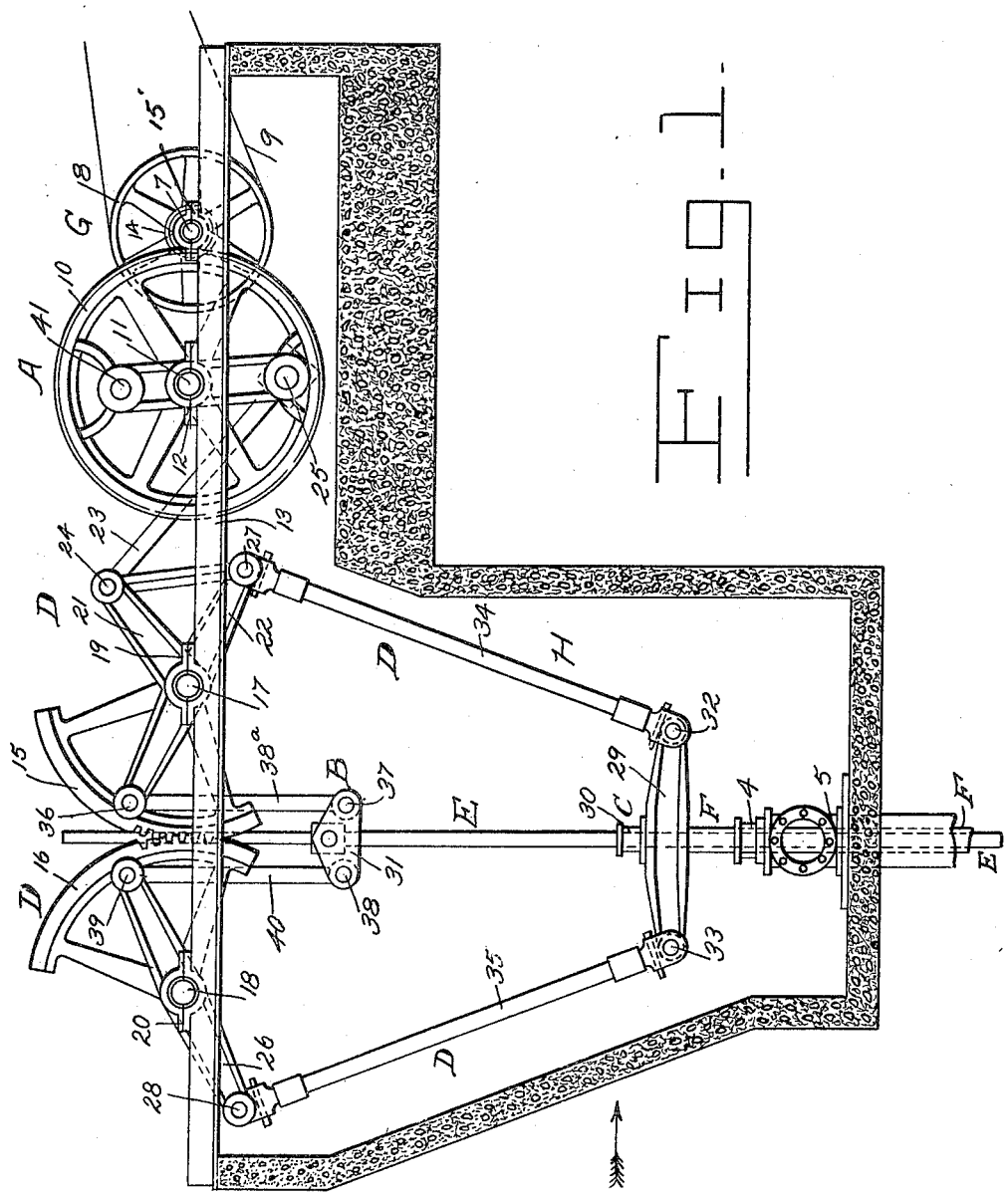

W. W. WILSON.
MECHANICAL MOVEMENT.
APPLICATION FILED OCT. 16, 1912.

1,104,462.

Patented July 21, 1914.

2 SHEETS—SHEET 1.

Witnesses,
H. Gearing.
Alfred H. Daehler

Inventor,
William W. Wilson,
By Raymond W. Blakeslee,
his Attorney.

W. W. WILSON.
MECHANICAL MOVEMENT.
APPLICATION FILED OCT. 16, 1912.

1,104,462.

Patented July 21, 1914.

2 SHEETS—SHEET 2.

Witnesses,
H. Gearing.
Alfred H. Daehler

Inventor,
William W. Wilson
By Raymond Ives Blakeslee,
his Attorney.

UNITED STATES PATENT OFFICE.

WILLIAM W. WILSON, OF LOS ANGELES, CALIFORNIA.

MECHANICAL MOVEMENT.

1,104,462.

Specification of Letters Patent.

Patented July 21, 1914.

Application filed October 16, 1912. Serial No. 726,063.

*To all whom it may concern:*

Be it known that I, WILLIAM W. WILSON, a citizen of the United States, residing at Los Angeles, in the county of Los Angeles and State of California, have invented new and useful Improvements in Mechanical Movements, of which the following is a specification.

This invention relates to mechanical movements whereby rotary motion may be translated into reciprocatory motion, or vice versa; and the invention has for its object to provide an improved mechanical movement of this character which will be relatively simple and inexpensive in construction and organization, which may be conveniently and satisfactorily constructed in the main out of stock materials and machine elements, which will be positive in operation, economical in consumption or loss of energy, which will be compact in form, which will be capable of long continued operation without appreciable deterioration or wear of working parts, which will be convenient in installation and assemblage and disconnection of parts and features for substitution or repair of parts, and which will be generally superior in efficiency and serviceability.

In a preferred form, such as shown in the drawings and hereinafter particularly described, the invention provides an improved mechanical movement particularly adapted for pump actuation, and for the actuation of pumps having a plurality of pistons, valves or valve-carrying pistons, which latter are oppositely actuated during simultaneous phases of their reciprocations.

With the above and other objects in view, the invention consists in the novel and useful combination, inter-relation and operative association of parts, members and features, together with the provision, construction and formation of such parts, members and features, all as hereinafter described, shown in the drawings and finally pointed out in claims.

Figure 2:
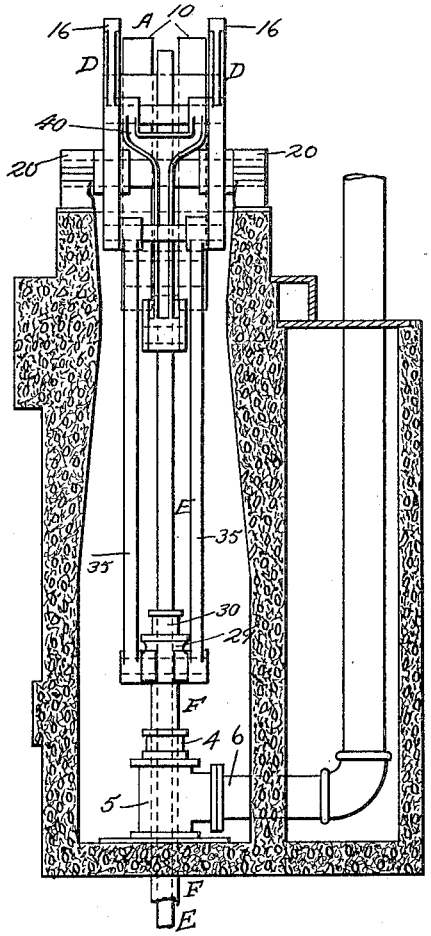
Figure 3:
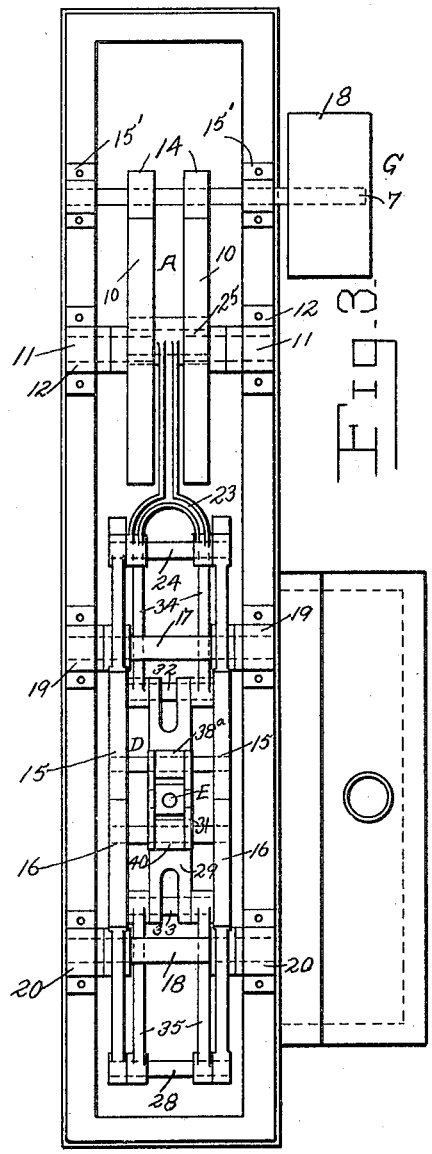

In the drawings:—Figure 1 is a side elevation of mechanism organized in accordance with the invention; Fig. 2 is an end elevation of the same, looking in the direction of the arrow in Fig. 1; and, Fig. 3 is a top plan view of the showing in the other figures.

Corresponding parts in all the figures are denoted by the same reference characters.

Referring with particularity to the drawings, the improved mechanical movement is shown therein as comprising in its embodiment a rotating member A, reciprocating members B and C respectively, and motion translating means D between and operatively connected with said members A, B and C, and whereby the motion of the rotating member A may be translated into reciprocatory motion of the members B and C; and whereby the reciprocatory motion of either or both of said latter members may be translated into rotary motion of the member A. Specifically, the motion translating means D are shown as organized to produce simultaneous phases of movement of the members B and C in opposite directions, in the reciprocation of said members B and C. Further, specifically, the member B is shown as connected up with a pump rod E; and the member C is shown as connected up with a pump rod or sleeve F, the pump rod being housed operatively to play within the pump sleeve, and said pump rod and pump sleeve carrying respectively at their lower ends pump pistons or valves or valved-pistons, the latter not being shown as not being concerned in the issues of the present invention, but only being referred to as exemplary of particular uses for which the improved mechanical movement is adapted. The pump rod and pump sleeve are shown as extending downwardly through a stuffing box 4 at the top of a well casing 5 from which, above the mouth of the well, extends laterally a main pipe through which the elevated fluid is discharged.

In the specific organization and arrangement of parts, members and features illustrated in the drawings, the rotating or rotary member A is shown as initially actuated to produce reciprocation of the reciprocatory members B and C; such rotary member A receiving its actuation from a prime mover or source of power G illustrated as a shaft 7 upon which is mounted a fixed pulley 8 rotated by a belt 9 extending to suitable motive means and producing rotation of the shaft 7 in a constant direction.

Coming down to a consideration of specific members, elements and features, such as those shown in the drawings, for embodying the improved mechanical movement, the member A may, as illustrated, comprise spaced gear wheels 10 mounted upon a shaft 11 journaled at its ends as at 12, upon parallel longitudinal frame or base members 13, suitably disposed and anchored so as to span a pit H at the bottom of which the well casing 5 terminates just above the mouth of the well. Pinions 14 upon the shaft 7 mesh respectively with the gears 10, such shaft being journaled at its ends as at 15', upon the members 13. More directly in vertical alinement with the top of the well casing 5, and centered respectively in vertical planes between which such casing top is located, are disposed pairs of toothed sectors 15 and 16, the sectors of each pair being spaced apart and mounted upon a separate shaft, 17 and 18 respectively, each of which shafts is journaled at its ends, as at 19 and 20, respectively, upon the frame or base members 13. Each of the sectors 15 meshes with one of the sectors 16. From each of the sectors 15 across the center of the shaft 17, extend braced radial arms 21 and 22 respectively, the arms 21 being parallel as are also the arms 22, from the former of which a pitman 23 extends respectively to the gear wheel 10 of the rotary member A, such pitman being connected with the respective ends of the arms 21. The pitman 23 is connected at its other end with the arms 21. The pitmen 23 are connected at their other ends with a short shaft 25 extending between the gear wheels 10 at corresponding points adjacent to the peripheries of said gear wheels.

Parallel radial arms 26 extend across the center of the shaft 18, from the toothed sectors 16, the length of each of which is equivalent to the length of each of the radial arms 22 of the sectors 15. A short shaft 27 extends between the outer ends of the radial arms 22; and a short shaft 28 extends between the outer ends of the radial arms 26. A cross-head 29 is connected with the upper end of the pump sleeve F, thus constituting the reciprocatory member C; a stuffing box 30 being provided upon said cross-head, and through which the pump rod E works. A cross-head 31 is connected with the pump rod E, above the cross-head 29, and constitutes the reciprocatory member B. At each end of the cross-head 29 is provided a short shaft, 32 and 33 respectively. Pitmen 34 extend between the short shaft 27 and the short shaft 32; and pitmen 35 extend between the short shaft 28 and the short shaft 33. A short shaft 36 extends between the toothed sectors 15, at points diametrically opposed to the ends of the radial arms 22; and the cross-head 31 carries at each end a short shaft 37 and 38, respectively. Parallel pitmen 38ª extend between the short shaft 36 and the short shaft 37. At points of the toothed sectors 16 diametrically opposed to the ends of the radial arms 26 are located the ends of a short shaft 39 between which and the short shaft 38 of the cross-head 31 extend parallel pitmen 40.

At opposite points in the gear wheels 10, diametrically opposed to the points in said gear wheels which receive the ends of the short shaft 25, for the pitman 23, may be formed shaft openings 41 to which the ends of the short shaft 25 may be shifted, such openings 41 being at a shorter distance from the center of the gears 10 than the openings which are shown in the drawings as receiving the ends of the shaft 25:—to the end that the throw of the pitman 23, and degree of oscillation of the toothed sectors 15 and 16, may be lessened.

The operation, method of use and advantages of the improved mechanical movement constituting the invention will be readily understood from the foregoing description, taken in connection with the accompanying drawings and the following statement:— The operation of the mechanical movement with respect to actuation of the pump rod E and pump sleeve or hollow pump rod F will be explained, whereby the rotation of the rotary member A is translated into reciprocation of said pump rods or pump rod and pump sleeve, in opposite directions. It will be understood that rotation of the rotary member A may be produced by reciprocating each or both of the reciprocatory members B and C, through the translating means D; and that such translated rotary movement or such translated reciprocatory movement may be utilized for the actuation of any mechanism or part or parts thereof for which such translated and applied movement is adapted.

In utilizing the mechanical movement for the specific purposes herein treated of and disclosed in the drawings, the constantly rotating member A, comprising the two gear wheels 10, cause through their pitmen 23 joint oscillation of both pairs of toothed sectors 15 and 16, the teeth of each sector 15 meshing with the teeth of the companion sector 16. This joint oscillation causes the pitmen 34 and 35 to vertically reciprocate the cross-head 29, and causes the pitmen 38ª and 40 to vertically reciprocate the cross-head 31, such cross-heads moving oppositely simultaneously, and correspondingly actuating the pump rod or sleeve F and the pump rod E respectively. The translation of motion recited is accomplished by the utilization of few parts which operate with slight frictional losses and with that smoothness which is demanded in those services in which rack and strain and jar are fatal to true and uniform operation. Particularly are these results desirable in connection with pump operation. Ordinarily, guides are required to hold the reciprocating pump rods and attendant features to their paths of play. The use of such guides is obviated in practising the invention in connection with pumps, as the reciprocatory members B and C move in straight-away paths, being subject to no influences which tend to deflect them from such courses.

The entire translating mechanism is compact in form and may readily be installed in position at the mouth of a well or in other mechanical environment, without occupation of unnecessary space. The component parts and features are relatively few in number and simple in nature and most of the same may be obtained as stock supplies and materials.

I do not desire to be understood as limiting myself to the particular construction, organization, method of operation or mode of application shown and described; but reserve the right to vary the same, in adapting the invention to varying conditions of use and service, without departing from the spirit of the invention or the terms of the following claims.

Having thus described my invention, I claim and desire to secure by Letters Patent:—

1. A mechanical movement, comprising two oscillatory members having fixed centers and operatively connected and executing movements in opposite directions, a reciprocatory member having rectilinear movement, means for imparting motion to said oscillatory members, and operative connections between each of said oscillatory members and said reciprocatory member.

2. A mechanical movement, comprising a rotary member, two oscillatory members having inter-meshing teeth, a reciprocatory member, operative connections between said rotary member and one of said oscillatory members, and operative connections between each of said oscillatory members and said reciprocatory member.

3. A mechanical movement, comprising a rotary member, two reciprocatory members, two oscillatory members having intermeshing teeth, operative connections between said rotary member and one of said oscillatory members and separate operative connections between each of said oscillatory members and each of said reciprocatory members.

4. A mechanical movement, comprising a gear wheel, intermeshing toothed sectors, a pitman between the gear wheel and one of the sectors, arms projecting respectively from the sectors, two reciprocatory cross-heads, and separate pitmen extending from the sectors and the arms thereof to the cross-heads.

5. A mechanical movement, comprising a gear wheel, intermeshing toothed sectors, a pitman between the gear wheel and one of the sectors, arms projecting respectively from the sectors, two reciprocatory cross-heads, and separate pitmen extending from the sectors and the arms thereof to the cross-heads, one of said cross-heads having a projecting part passing slidably through the other cross-head.

6. A mechanical movement, comprising two spaced gear wheels, two pairs of sectors having inter-meshing teeth, the sectors of each pair being spaced, two reciprocatory members, a pitman between the gear wheels and one pair of sectors, the sectors being provided with projecting arms, pitmen between said arms and one of the reciprocatory members, and other pitmen extending between said sectors and the other reciprocatory member.

In testimony whereof, I have signed my name to this specification in the presence of two subscribing witnesses.

WILLIAM W. WILSON.

Witnesses:
RAYMOND IVES BLAKESLEE,
H. H. HARRIS.

---

Copies of this patent may be obtained for five cents each, by addressing the "Commissioner of Patents, Washington, D. C."